(12) United States Patent
Froggatt et al.

(10) Patent No.: US 6,376,830 B1
(45) Date of Patent: Apr. 23, 2002

(54) SYSTEM AND METHOD FOR MEASURING THE TRANSFER FUNCTION OF A GUIDED WAVE DEVICE

(75) Inventors: Mark E. Froggatt, Yorktown, VA (US); Turan Erdogan, Spencerport, NY (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/606,120

(22) Filed: Jun. 15, 2000

Related U.S. Application Data

(60) Provisional application No. 60/153,873, filed on Sep. 14, 1999.

(51) Int. Cl.$^7$ ............................................... G01C 19/64
(52) U.S. Cl. .................... 250/227.14; 250/226; 356/464
(58) Field of Search ................................ 250/225, 226, 250/227.14–227.19; 356/462, 464

(56) References Cited

U.S. PATENT DOCUMENTS 4,828,389 A * 5/1989 Gubbins et al. ............ 356/432
5,563,705 A * 10/1996 Sanders ....................... 356/464

OTHER PUBLICATIONS

Volanthen, M. Et al., "low coherence technique to characterise reflectivity and time delay as a function of wavelength within a long fibre grating" *Electronics Letters*, GB, IEE Stevenage, vol. 32, No. 8, Apr. 11, 1996, pp. 757–788.

(List continued on next page.)

*Primary Examiner*—Stephone B. Allen
(74) *Attorney, Agent, or Firm*—Kurt G. Hammerle

(57) ABSTRACT

A method/system are provided for measuring the N×N scalar transfer function elements for an N-port guided wave device. Optical energy of a selected wavelength is generated at a source and directed along N reference optical paths having N reference path lengths. Each reference optical path terminates in one of N detectors such that N reference signals are produced at the N detectors. The reference signals are indicative of amplitude, phase and frequency of the optical energy carried along the N reference optical paths. The optical energy from the source is also directed to the N-ports of the guided wave device and then on to each of the N detectors such that N measurement optical paths are defined between the source and each of the N detectors. A portion of the optical energy is modified in terms of at least one of the amplitude and phase to produce N modified signals at each of the N detectors. At each of the N detectors, each of the N modified signals is combined with a corresponding one of the N reference signals to produce corresponding N combined signals at each of the N detectors. A total of $N^2$ measurement signals are generated by the N detectors. Each of the $N^2$ measurement signals is sampled at a wave number increment $\Delta k$ so that $N^2$ sampled signals are produced. The N×N transfer function elements are generated using the $N^2$ sampled signals. Reference and measurement path length constraints are defined such that the N combined signals at each of the N detectors are spatially separated from one another in the time domain.

9 Claims, 4 Drawing Sheets

OTHER PUBLICATIONS

Takada K., et al., "Optical low coherence method for characterizing silica–based arrayed–waveguide grating multiplexers", *J. Lightwave Technology,* Vo. 14, No. 7, Jul. 1, 1996, pp. 1677–1689.

Cohen, L. G., "Comparison of single–mode fiber dispersion measurement techniques", *J. Lightwave Technology,* vol. LT–3, No. 5, Oct. 1985, pp. 958–966.

Okoshi, T., et al., "Measuring the complex frequency response of multimode optical fibers", *Applied Optics,* vol. 20, No. 15, Apr. 15, 1981, pp. 1414–1417.

M. M. Ohn et al, "Measurement of Fiber Grating Properties Using an Interferometric and Fourier–transform–based Technique", Conference on Optical Fiber Communications, IEEE/Lasers and Electro–Optics Society, pp. 154–155, (Feb. 16, 1997).

U. Glombitza and E. Brinkmeyer, "Coherent Frequency–Domain Reflectometry for Characterization of Single–Mode Integrated–Optical Waveguides", Journal of Lightwave Technology, vol. 11 (No. 8), pp. 1377–1384, (Aug. 1, 1993).

* cited by examiner

SYSTEM AND METHOD FOR MEASURING THE TRANSFER FUNCTION OF A GUIDED WAVE DEVICE

CLAIM OF BENIFIT OF PROVISIONAL APPLICATION

Pursuant to 35 U.S.C. Section 119, the benefit of priority from provisional application 60/153,873, with a filing date of Sep. 14, 1999, is claimed for this non- provisional application.

ORIGIN OF THE INVENTION

The invention was jointly made by a NASA employee and a non-governmental inventor and may be manufactured and used by or for the Government for governmental purposes without the payment of any royalties thereon or therefor.

BACKGROUND OF THE INVENTION

1. Field of the Invention

This invention relates to measuring the transfer function of optical devices. More specifically, the invention is a system and method for measuring the transfer function associated with single-port guided wave device or the transfer function matrix of a multi-port guided wave device, e.g., Bragg gratings, couplers, etc.

2. Description of the Related Art

A variety of guided wave devices (e.g., Bragg gratings, directional couplers, isolators, amplitude modulators, amplifiers, wave division multiplexers, etc.) are used in the world's telecommunication network. In order to understand and predict how these devices will affect an incoming (light) signal, it is necessary to characterize the impulse response (i.e., know the transfer function or transfer function matrix) of these devices. Current systems/methodologies for measuring such transfer functions are very expensive, slow, and/or subject to unsatisfactory levels of error.

One commercially available impulse response characterization system is shown in FIG. 1 where light from a tunable laser 10 undergoes amplitude modulation at 12 as controlled by a fixed frequency oscillator 14. The modulated light is directed (by an optical coupler 16) down an optical fiber 18 to a device under test (DUT) 20 such as a Bragg grating. The light will at least partially reflect off DUT 20 and pass back through optical coupler 16 where it is directed to a detector 22. The (modulated) reflection signal at detector 22 is recovered with some phase shift as measured by a vector volt meter 24. Due to the nature of DUT 20, the delay experienced by the reflected signal is a function of the center wavelength of tunable laser 10. The delay as a function of this center wavelength (i.e., dispersion measurement) is used to characterize DUT 20. However, this system is expensive and can take twenty minutes to test a single device.

SUMMARY OF THE INVENTION

Accordingly, it is an object of the present invention to provide a system for measuring transfer functions of guided wave devices.

Another object of the present invention is to provide a simple and inexpensive system for measuring transfer functions of a variety of guided wave devices.

Still another object of the present invention is to reduce the time required to measure transfer functions associated with guided wave devices.

Other objects and advantages of the present invention will become more obvious hereinafter in the specification and drawings.

In accordance with the present invention, a method and system are provided for measuring the N×N scalar transfer function elements for an N-port guided wave device. The device has a maximum effective path length $L_D$ and an effective index n. Optical energy of a selected wavelength is generated at a source and directed along N reference optical paths having N reference path lengths $L_{Ri}$, i=1 to N. Each reference optical path terminates in one of N detectors such that N reference signals are produced at the N detectors. The reference signals are indicative of amplitude, phase and frequency of the optical energy carried along the N reference optical paths. The optical energy from the source is also directed to the N-ports of the guided wave device and then on to each of the N detectors such that N measurement optical paths are defined between the source and each of the N detectors. A portion of the optical energy is modified in terms of at least one of the amplitude and phase to produce N modified signals at each of the N detectors. At each of the N detectors, each of the N modified signals is combined with a corresponding one of the N reference signals to produce N combined signals at each of the corresponding N detectors. A total of $N^2$ measurement signals are generated by the N detectors. Each of the $N^2$ measurement signals is sampled at a wave number increment $\Delta k$ so that $N^2$ sampled signals are produced. In the present invention, it is required to define N measurement path lengths $L_{Mj}$, j=1 to N, of the N measurement optical paths associated with each of the N detectors such that $$|L_{Ri}-L_{Mj}|>N*L_D|_{j=1,N}|_{i=1,N},$$

$$|L_{Ri}-L_{Mj}|+L_D<\frac{\pi}{2n\Delta k}\Big|_{j=1,N}\Big|_{i=1,N},$$

and such that the N combined signals at each of the N detectors are spatially separated from one another in the time domain. The N×N transfer function elements are generated using the $N^2$ sampled signals.

DETAILED DESCRIPTION OF THE INVENTION

Figure 1:
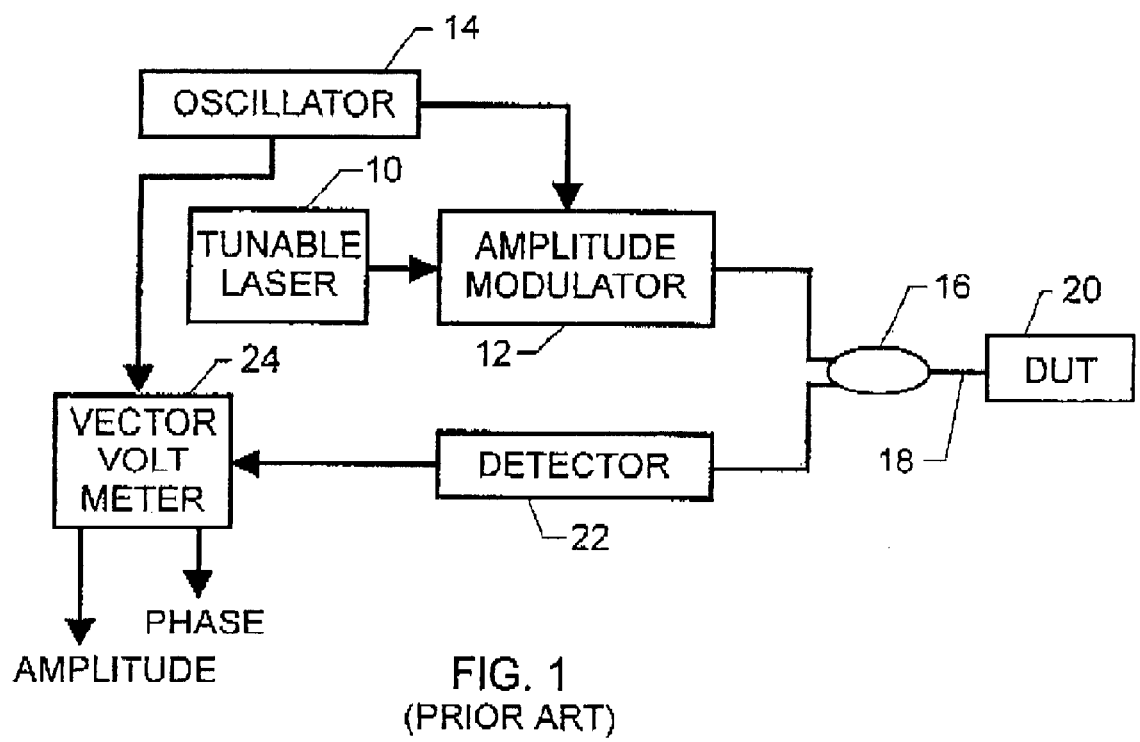
FIG. 1 is a erratic view of a prior art system used to characterize the impulse response of a guided wave device.
Figure 2:
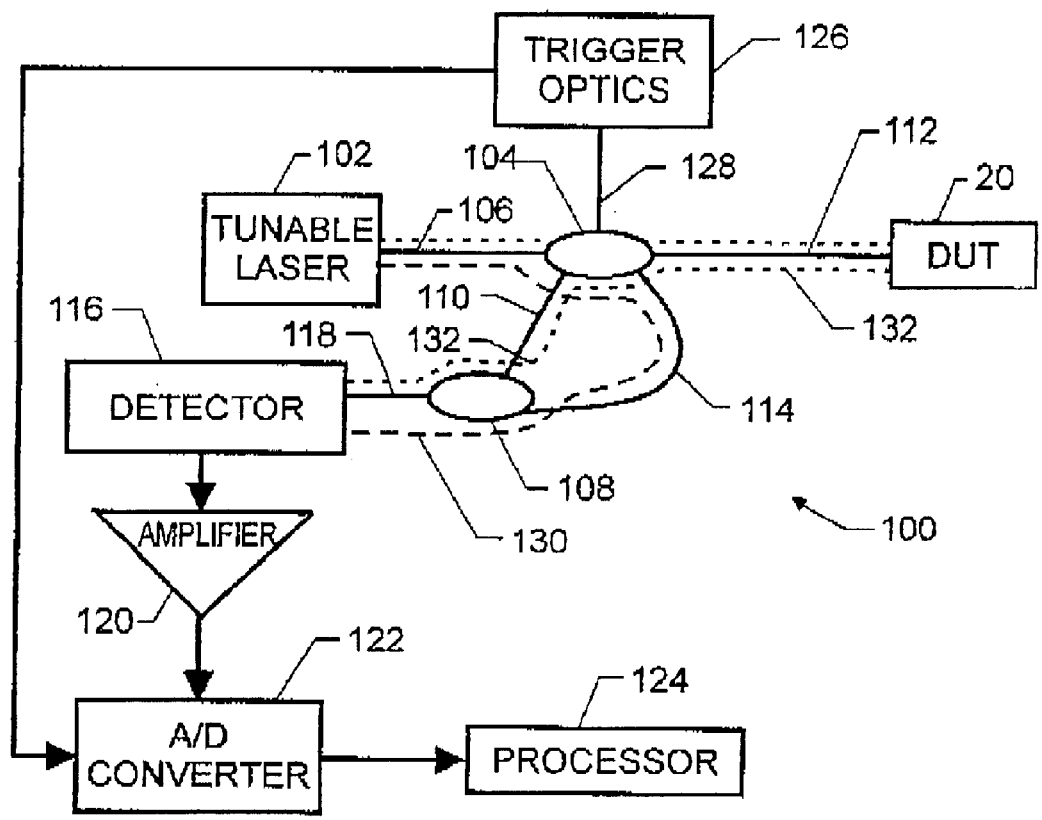
FIG. 2 is a schematic view of an embodiment of the present invention for measuring the transfer function of a single-port guided wave device.

Referring now to the drawings, and more particularly to FIG. 2, an embodiment of a system for measuring the transfer function of a single-port guided wave device (e.g., device under test or DUT 20) is shown and referenced generally by numeral 100. For simplicity of explanation, the novel features of the present invention will be explained using system 100 configured for a single-port DUT 20. However, as will be explained further below, the present invention can be adapted/used to measure the transfer function matrix of an N-port guided wave device.

System 100 has a tunable laser (or other optical energy source) 102 coupled to an optical coupler 104 via an optical fiber 106. Optical coupler 104 is a standard directional optical coupler used to direct or route incoming optical energy along specific output paths as is well understood in the art. One output of optical coupler 104 is coupled to optical coupler 108 via optical fiber 110. Another output of optical coupler 104 is coupled to DUT 20 via optical fiber 112. A third output of optical coupler 104 is coupled to optical coupler 108 via optical fiber 114. An output of optical coupler 108 is coupled to an optical detector 116 via optical fiber 118. The output signal of detector 116 is amplified by an amplifier 120 and sampled by an analog-to-digital converter 122 as controlled by a trigger signal. The sampled signal is supplied to a processor 124. The trigger signal supplied to A/D converter 122 originates from trigger optics 126 which is coupled to tunable laser 102 via optical coupler 104 and optical fiber 128.

For system 100, a selected frequency of optical energy from tunable laser 102 is sent to optical coupler 104 via optical fiber 106. In accordance with the characteristics of optical coupler 104, a portion of the optical energy is output into each of optical fibers 112, 114 and 128. The optical energy sent through optical fiber 112 travels to DUT 20 where a portion is reflected or otherwise modified (e.g., transmission modification) with the modified optical energy being sent back through optical fiber 112 to optical coupler 104 and through optical fiber 110 to optical coupler 108. The optical energy sent through optical fiber 114 travels to optical coupler 108. The optical energy sent through optical fiber 128 is received by trigger optics 126 to generate the trigger signal used by A/D converter 122. Briefly, trigger optics 126 uses the laser input to create a trigger signal indicative of equal increments in wave number. While such trigger signal generators are known in the art, one embodiment of trigger optics 126 will be explained by way of example later in the description.

Critical constraints on system 100 will now be described. Let the maximum effective path length of DUT 20 be defined as $L_D$ and the effective index of DUT be defined as "n". Both of these parameters are known (or can be readily determined) for DUT 20 as is known in the art. Briefly, the maximum effective path length $L_D$ is the maximum length of the path that optical energy will travel within DUT 20 before exiting regardless of the port of entry. The effective index n is the wavelength of light in a vacuum divided by the wavelength of light in the guided wave device as a function of frequency.

A reference path length, $L_R$, is defined as the length of the path optical energy travels along optical fiber 106 to optical coupler 104, through optical coupler 104 to optical fiber 114, along optical fiber 114 to optical coupler 108, through optical coupler 108 to optical fiber 118, and to detector 116. This path is illustrated in FIG. 2 by dashed line 130.

A measurement path length, $L_M$, is defined as the length of the path optical energy will travel along optical fiber 106 to optical coupler 104, through optical coupler 104 to optical fiber 112, along optical fiber 112 to DUT 20 where some of the optical energy reflects back along optical fiber 112 to optical coupler 104, through optical coupler 104 to optical fiber 110, along optical fiber 110 to optical coupler 108, through optical coupler 108 to optical fiber 118 and to detector 116. This path is illustrated in FIG. 2 by dotted line 132.

In the present invention, the following two constraints must be met in order to measure the transfer function of DUT 20. Specifically, $$|L_R - L_M| > N^* L_D \text{ where } N=1 \quad (1)$$

and $$|L_R - L_M| + L_D < \frac{\pi}{2n\Delta k} \quad (2)$$

where n is the effective index of DUT 20 and $\Delta k$ is the wave number increment generated by trigger optics 126.

In operation, optical energy at a selected frequency is sent into optical fiber 106 from tunable laser 102. The optical energy traverses the various optical paths as described above. Detector 116 measures the optical energy traversing path 130 and produces a reference signal indicative of the amplitude, phase and frequency of the optical energy. Detector 116 also measures a combination of the optical energy traversing each of paths 130 and 132. The continuous signal indicative of this combination is amplified (at amplifier 120) and sampled at A/D converter 122 in accordance with the wave number increment $\Delta k$. The sampled signals are passed to processor 124 which generates the transfer function of DUT 20 from the sampled signals. That is, processor 124 Fourier transfonns the data measured at detector 116 to extract the relevant impulse response of DUT 20. The impulse response data can be broken out into distinct locations as defined by the scatter or S-parameters of system 100. The complex impulse response can be extracted for each of the S-parameters and transformed back into the frequency domain via an inverse Fourier transform to produce the standard set of S-parameters of DUT 20.

Figure 3:
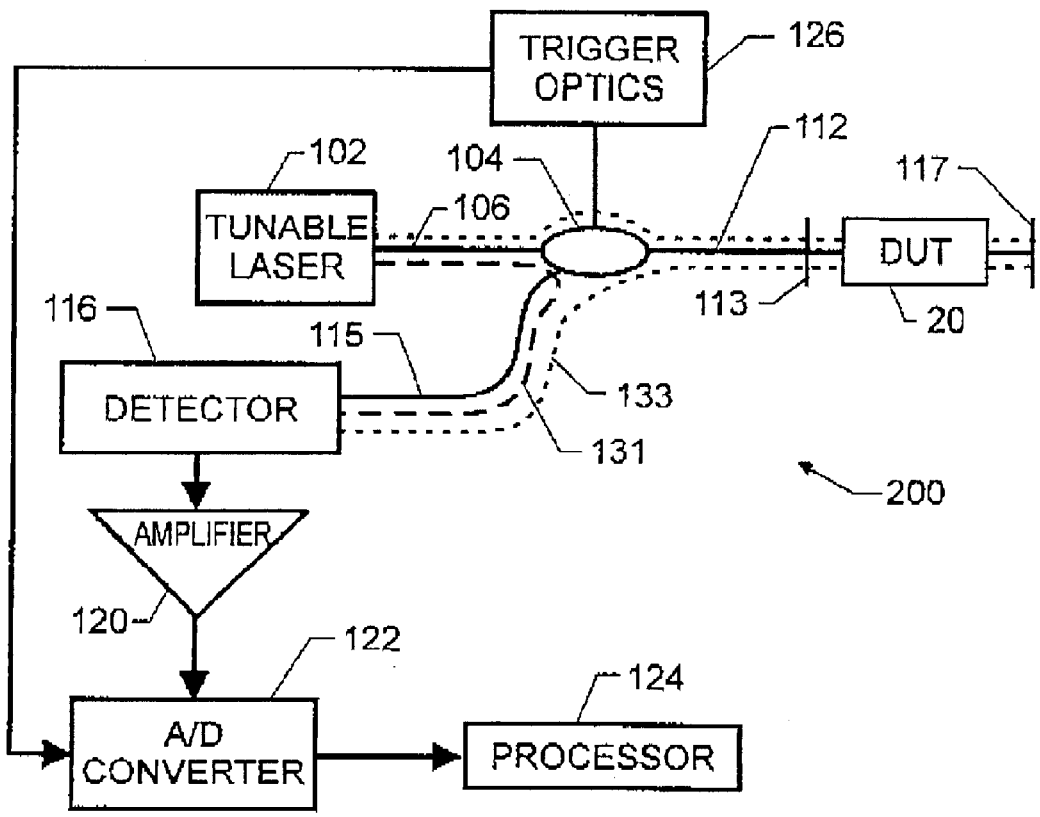
FIG. 3 is a schematic view of another embodiment of the present invention for measuring the transfer function of a single-port guided wave device.

As mentioned above, the present invention is not limited to the arrangement defined in system 100. One alternative system for measuring the transfer function in accordance with the present invention is illustrated by system 200 in FIG. 3. Elements common to systems 100 and 200 use identical reference numerals and will not be described further. In system 200, a discrete wavelength-independent reflector 113 is placed in line with optical fiber 112 and a cleaved fiber end 117 is provided on the far side of DUT 20. A single optical fiber 115 couples optical coupler 104 to detector 116. The reference path length $L_R$ is defined by the length traversed by dashed line 131 and the measurement path length $L_M$ is defined by the length traversed by dotted line 133. Note that optical energy transmitted twice through DUT 20 and reflected off cleaved end 117 interferes with the optical energy along reference path 131.

Figure 4:
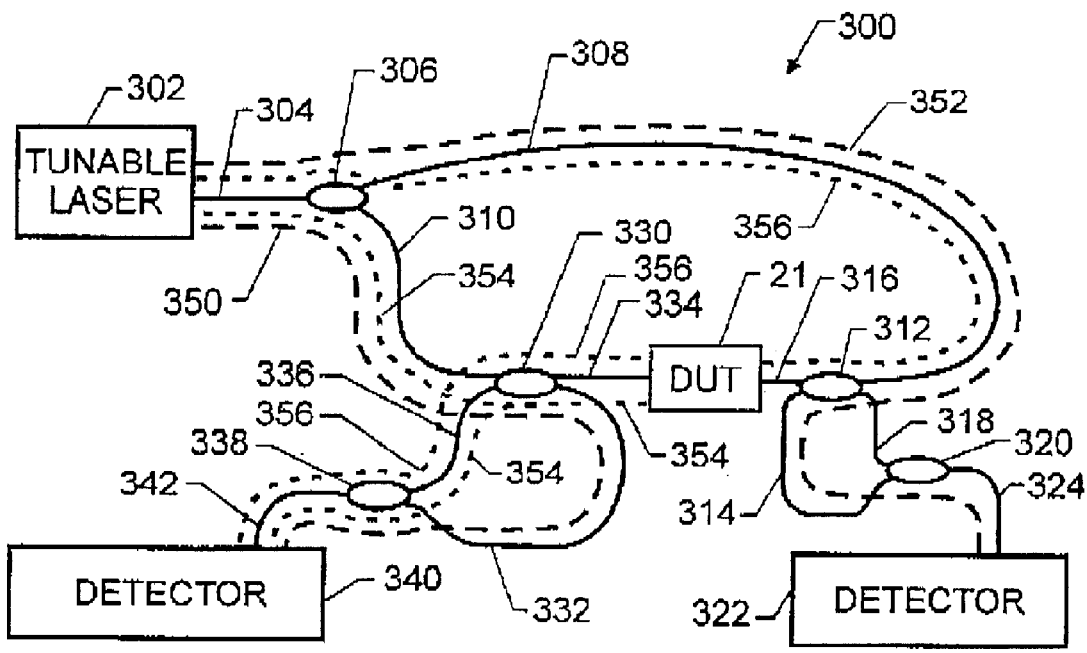
FIG. 4 is schematic view of an embodiment of the present invention for measuring the transfer function matrix of a two-port guided wave device.

The present invention can also be used to measure the transfer function matrix of N-port guided wave devices. For example, a system 300 for measuring the 2×2 transfer function matrix of a two-port device under test (DUT) 21 is illustrated in FIG. 4. The triggering optics, processor, and amplifiers/analog-to-digital converters associated with each of detectors 322 and 340, are not shown for clarity of illustration. Note that for an N-port guided wave device, the present invention measures the device's N×N transfer function matrix having $N^2$ scalar transfer function elements.

In system 300, a tunable laser 302 sends optical energy into optical fiber 304. An optical coupler 306 distributes the optical energy into optical fibers 308 and 310. Optical fiber 308 terminates in an optical coupler 312 which distributes the received optical energy into an optical fiber 314 forming part of a reference path and an optical fiber 316 forming part of a measurement path that leads to DUT 21. Optical energy traveling back to optical coupler 312 along optical fiber 316 is passed to optical fiber 318. Optical energy travels along optical fibers 314 and 318 and is combined at optical coupler 320 before impinging on a detector 322 via an optical fiber 324. In similar fashion, optical coupler 330 distributes optical energy received from optical fiber 310 to an optical fiber 332 forming part of a reference path and to an optical fiber 334 forming part of a measurement path leading to DUT 21. Optical energy traveling back to optical coupler 330 along optical fiber 334 is passed to an optical fiber 336. Optical energy travels along optical fibers 332 and 336 and is combined at optical coupler 338 before impinging on a detector 340 via optical fiber 342. Two reference paths are illustrated as dashed lines 350 and 352. While four measurement paths are possible, only two are shown (i.e., dotted lines 354 and 356) for clarity of illustration. Path 354 traverses optical fibers 304, 310 and 334 to DUT 21, and then back along optical fibers 334, 336 and 342 to detector 340. Path 356 traverses optical fibers 304, 308 and 316 to DUT 21, and then through DUT 21 and along optical fibers 334, 336 and 342 to detector 340.

For system 300 to operate in accordance with the present invention, the constraints set forth in equations (1) and (2) must be met. For the illustrated example, $$|L_{R(350)} - L_{M(354)}| > 2L_D \quad (3)$$

$$|L_{R(350)} - L_{M(356)}| > 2L_D \quad (4)$$

$$|L_{R(350)} - L_{M(354)}| + L_D < \frac{\pi}{2n\Delta k} \quad (5)$$

$$|L_{R(350)} - L_{M(356)}| + L_D < \frac{\pi}{2n\Delta k} \quad (6)$$

Analogous equations can be written for $L_{R(352)}$ and the measurement paths associated with detector 322. In addition to the above constraints, the various measurement path lengths must be constructed to prevent any overlap (in the time domain). That is, measurement path lengths must be constructed so that signals at each detector (e.g., detectors 322 and 340) are spatially separated in the time domain. This provides for easy extraction of each individual scalar transfer function element of the N×N transfer function matrix.

Figure 5:
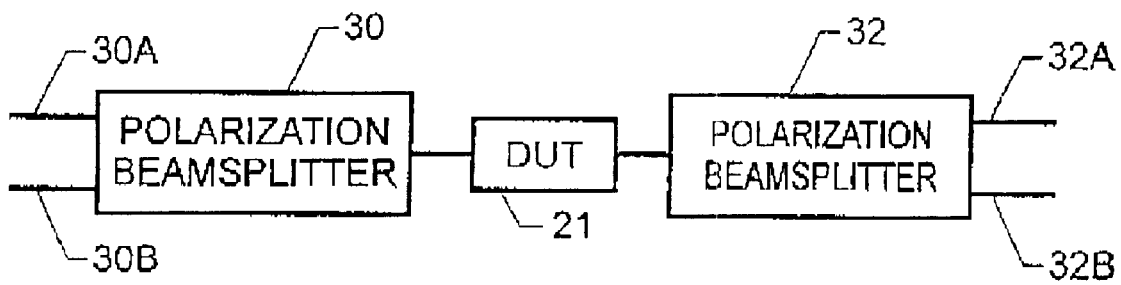
FIG. 5 chematic view of a two-port guided wave device having a polarization beamsplitter coupled to each port thereof in order to account for polarization effects of the two-port guided wave device.

Note that two-port devices actually resemble a four-port device if polarization effects are considered. The present invention can easily be adapted to consider such polarization effects. For example, a polarization beamsplitter can be coupled to either port of DUT 21. This is illustrated in FIG. 5 where the s and p polarization states for each port of DUT 21 are isolated by the use of polarization beam splitters 30 and 32. The s polarization appears on ports 30A and 32A while the p polarization appears on ports 30B and 32B. Thus, the device under test essentially becomes a four-port device that is the combination of DUT 21 and beam splitters 30 and 32.

The present invention can be generalized for an N-port DUT as follows. For an N-port device, there are N reference paths with each reference path terminating at one of N detectors. For each reference path terminating at a detector, there are N measurement path possibilities terminating at the same detector. Thus, each of the N detectors combines the signal from its associated reference path with each "measurement path" signal generated by the N measurement paths associated with that detector. As a result, N combined signals are formed at each detector and $N^2$ combined signals are formed overall. Mathematically, equations (1) and (2) can be generalized as follows:

$$|L_{Ri-LMj}|_{>N} \cdot L_D|_{j=1,N}|_{i=1,N} \quad (7)$$

and $$|L_{Ri} - L_{Mj}| + L_D < \frac{\pi}{2n\Delta k}\Big|_{j=1,N}\Big|_{i=1,N} \quad (8)$$

Further, as in the previous two-port device example, the measurement path lengths (associated with each detector) must be constructed to prevent overlap of the detector's N combined signals in the time domain in order to facilitate parameter extraction during inverse Fourier transformation.

Figure 6:
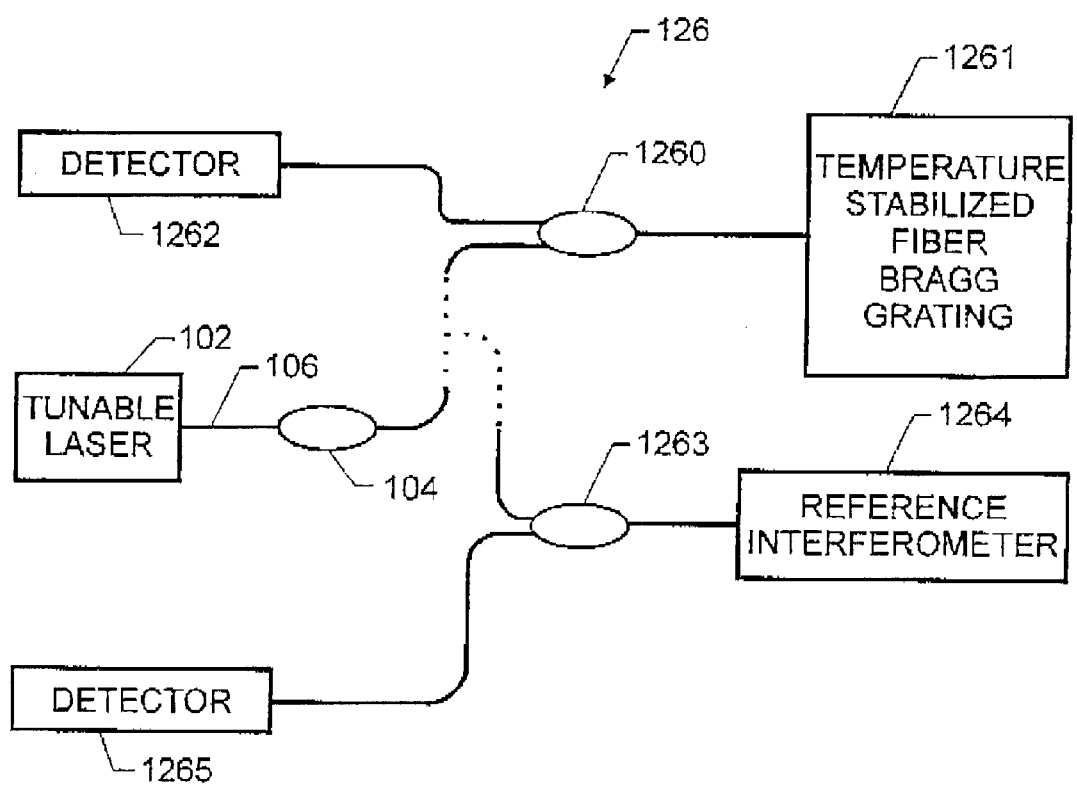
FIG. 6 is a schematic view of an embodiment of the trigger optics used in the present invention.

As noted above, the generation of a trigger signal by trigger optics 126 (FIG. 2) can be achieved in a variety of ways. One example for doing this is illustrated in FIG. 6 where optical energy from tunable laser 102 is directed via optical coupler 1260 to a temperature stabilized/compensated fiber Bragg grating 1261 which serves as an absolute wavelength marker. A signal generated at a detector 1262 is the result of reflected power from grating 1261. The optical energy from tunable laser 102 is also directed by an optical coupler 1263 to a long (e.g., 10–100 meters) reference interferometer 1264 which is used to mark off well defined wave number increments as tunable laser 102 is swept. The signal generated at detector 1265 is indicative of the interference fringes coming from reference interferometer 1264. The wave number increments are fed to the A/D converter(s) (not shown) coupled to each system detector as described above.

Figure 7:
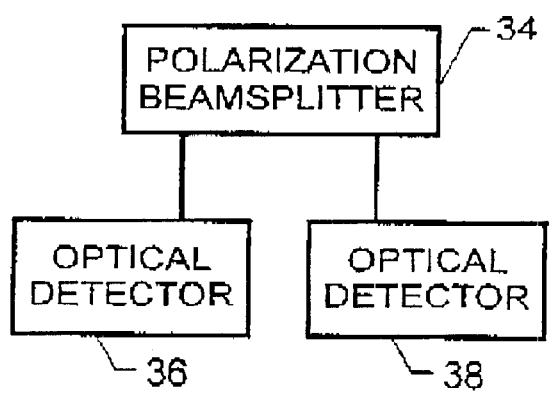
FIG. 7 is a schematic view of a polarization beamsplitter having two detectors coupled thereto in order to account for polarization effects of the guided wave device being tested.

Although the invention has been described relative to a specific embodiment thereof, there are numerous variations and modifications that will be readily apparent to those skilled in the art in light of the above teachings. For example, the present invention could be adapted to account for the polarization effects of the DUT other than as described above. Instead, a polarization beamsplitter could be placed before each optical detector which would be replaced by separate optical detectors for detecting the s and p polarization states. This is illustrated in FIG. 7 where the combination of a polarization beamsplitter 34 and optical detectors 36 and 38 could replace, for example, each of detectors 322 and 340 in the FIG. 4 embodiment. The tunable laser (not shown in FIG. 7) and/or optical detectors 36 and 38 must be adjusted so that the reference power is divided equally between detectors 36 and 38. This guarantees that the optical energy returning from the DUT (not shown in FIG. 7) will be fully detected with no polarization fading. Further, the relative phase between the signals at the two detectors will be meaningful with regard to the state of the polarization. The availability of meaningful relative phase information in addition to the relative amplitude information means that the polarization state is fully characterized. All that is needed is a means of mapping the somewhat arbitrary modes detected by the two detectors to the linear modes on some axis at the DUT. Such mapping can be accomplished using a lossless Jones matrix with an arbitrary phase and two independent variables that must be determined by a system calibration.

It is therefore to be understood that, within the scope of the appended claims, the invention may be practiced other than as specifically described.

What is claimed as new and desired to be secured by Letters Patent of the United States is:

1. For an N-port guided wave device having a maximum effective path length $L_D$ and an effective index n, the guided wave device being defined by a transfer function matrix having N×N scalar transfer function elements, a system for measuring each of the N×N transfer function elements comprising:

a tunable source for generating optical energy of a selected wavelength;

first means coupled to said source for directing said optical energy along N reference paths and for producing N reference signals indicative of amplitude, phase and frequency of said optical energy carried along said N reference paths;

second means coupled to said source for directing said optical energy to the N-ports of the guided wave device, wherein a portion of said optical energy is modified in terms of at least one of said amplitude and said phase to produce $N^2$ modified signals;

third means coupled to said first means and said second means for combining each of said $N^2$ modified signals with a corresponding one of said N reference signals to produce corresponding $N^2$ combined signals;

fourth means coupled to said tunable source and said third means for sampling each of said $N^2$ combined signals at a wave number increment $\Delta k$, wherein corresponding $N^2$ sampled signals are produced;

said first means defining N reference path lengths $L_{Ri}$, i=1 to N, and said second means and said third means defining N combined path lengths $L_{Mj}$, j=1 to N, for each of said N reference paths, wherein $|L_{Ri}-L_{Mi}|>N*L_D \mid_{j=1,N} \mid_{i=1,N}$ and $|L_{Ri} - L_{Mi}| + L_D < \frac{\pi}{2n\Delta k} \Big|_{j=1,N} \Big|_{i=1,N}$, and wherein N combined signals of said $N^2$ combined signals that are associated with said corresponding one of said N reference signals are spatially separated from one another in the time domain; and a processor coupled to said fourth means for generating the N×N transfer function elements of the transfer function matrix using said $N^2$ sampled signals.

2. A system as in claim 1 wherein said tunable source is a tunable laser.

3. A system as in claim 1 wherein said first means comprises:

a first plurality of optical elements coupled to said tunable source for defining each of said N reference paths; and optical detection means terminating each of said N reference paths.

4. A system as in claim 3 wherein, for each of the N-ports of the guided wave device, said second means comprises:

a portion of said first plurality of optical elements; and a second plurality of optical elements coupled to said portion of said first plurality of optical elements and to a corresponding one of the N-ports of the guided wave device.

5. A system as in claim 4 wherein, for each of the N-ports of the guided wave device, said third means comprises:

said second plurality of optical elements associated with a corresponding one of the N-ports;

a third plurality of optical elements coupled to said second plurality of optical elements associated with said corresponding one of the N-ports; and an optical combiner disposed in a corresponding one of said N reference paths and coupled to said third plurality of optical elements, wherein said N combined signals impinge on said optical detection means terminating said one of said N reference paths.

6. A system as in claim 3 wherein said fourth means comprises:

an analog-to-digital (AID) converter coupled to each said optical detection means; and trigger optics coupled to said tunable source and each said A/D converter to produce a trigger signal at each said wave number increment $\Delta k$, wherein each said A/D converter samples a corresponding one of said $N^2$ combined signals in response to each said trigger signal.

7. A system as in claim 3 wherein further comprising a polarization beamsplitter coupled to said first plurality of optical elements wherein said polarization beamsplitter outputs individual polarization states to said optical detection means.

8. For an N-port guided wave device having a maximum effective path length $L_D$ and an effective index n, the guided wave device being defined by a transfer function matrix having N×N scalar transfer function elements, a method of measuring each of the N×N transfer function elements comprising:

a) generating optical energy of a selected wavelength at a source;

b) directing said optical energy from said source along N reference optical paths having N reference path lengths $L_{Ri}$, i=1 to N, each of said reference optical paths terminating in one of N detectors;

c) producing N reference signals at said N detectors indicative of amplitude, phase and frequency of said optical energy carried along said N reference optical paths;

d) directing said optical energy from said source to the N-ports of the guided wave device and then on to each of said N detectors, wherein N measurement optical paths are defined between said source and each of said N detectors, and wherein a portion of said optical energy is modified in terms of at least one of said amplitude and said phase to produce N modified signals at each of said N detectors;

e) combining, at each of said N detectors, each of said N modified signals with a corresponding one of said N reference signals to produce corresponding N combined signals at each of said N detectors, wherein a total of $N^2$ measurement signals are generated by said N detectors;

f) sampling each of said $N^2$ measurement signals at a wave number increment $\Delta k$, wherein $N^2$ sampled signals are produced;

g) defining N measurement path lengths $L_{Mj}$, j=1 to N, of said N measurement optical paths associated with each of said N detectors wherein $$|L_{Ri}-L_{Mj}|>N*L_D|_{j=1,N}|_{i=1,N}$$

and $$|L_{Ri} - L_{Mj}| + L_D < \frac{\pi}{2n\Delta k}\Big|_{j=1,N}\Big|_{i=1,N},$$

and wherein said N combined signals at each of said N detectors are spatially separated from one another in the time domain; and h) generating the N×N transfer function elements of the transfer function matrix using said $N^2$ sampled signals.

9. A method according to claim 8 wherein said optical energy is a laser beam.

* * * * *